United States Patent  
Molholm et al.

(10) Patent No.: US 10,911,748 B1  
(45) Date of Patent: Feb. 2, 2021

(54) DISPLAY CALIBRATION SYSTEM (71) Applicant: Apple Inc., Cupertino, CA (US)

(72) Inventors: Robert Molholm, Scotts Valley, CA (US); Mingxia Gu, Campbell, CA (US); Lu Zhang, Campbell, CA (US); Francisco H. Imai, San Jose, CA (US); Jiaying Wu, San Jose, CA (US); Shahram Peyvandi, Santa Clara, CA (US); Gabriel Marcu, San Jose, CA (US); Po-Chieh Hung, Sunnyvale, CA (US); Xiran Wang, West Lafayette, IN (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/506,410

(22) Filed: Jul. 9, 2019

Related U.S. Application Data (60) Provisional application No. 62/696,233, filed on Jul. 10, 2018.

(51) Int. Cl.  
H04N 17/04 (2006.01)  
G06F 3/14 (2006.01)  
G06F 3/041 (2006.01)

(52) U.S. Cl.  
CPC ........... H04N 17/04 (2013.01); G06F 3/0418 (2013.01); G06F 3/1446 (2013.01); G09G 2320/0626 (2013.01); G09G 2320/0666 (2013.01); G09G 2320/0673 (2013.01); G09G 2320/0693 (2013.01)

(58) Field of Classification Search  
USPC ........................................................ 345/690  
See application file for complete search history.

(56) References Cited

U.S. PATENT DOCUMENTS 6,219,099 B1   4/2001   Johnson et al.  
6,771,307 B2   8/2004   Waki et al.  
7,133,148 B2   11/2006  Silverstein  
7,262,779 B1   8/2007   Sones  
(Continued)

OTHER PUBLICATIONS

THX Ltd., THX tune-up™, Retrieved from the Internet: <https://apps.apple.com/us/app/thx-tune-up/id592624594>.

(Continued)

Primary Examiner — Chineyere D Wills-Burns  
(74) Attorney, Agent, or Firm — Treyz Law Group, P.C.; Tianyi He (57) ABSTRACT A display calibration system may include a first electronic device that includes an ambient light sensor and a display to be calibrated in a second electronic device. The first electronic device may generate test patterns to be displayed on the display. The ambient light sensor may receive light emitted from the display based on the test patterns to generate display color space data. The first electronic device may generate calibration data for the display based on the display color space data and a target reference color space. The second electronic device may store the calibration data and use the calibration data to generate more accurate images. Because the first electronic device may include other functionalities other display calibration, specialized display calibration equipment may be omitted. Additionally, a third electronic device that acts as an intermediary between the first and second electronic devices.

23 Claims, 7 Drawing Sheets

(56) References Cited

U.S. PATENT DOCUMENTS

| | | | |
|---|---|---|---|
| 7,639,401 B2 | 12/2009 | Bala et al. | |
| 7,733,404 B2 | 6/2010 | Zandifar et al. | |
| 8,023,996 B2 | 9/2011 | Camp, Jr. | |
| 8,248,454 B2 | 8/2012 | Thielman | |
| 8,582,034 B2 | 11/2013 | Kwong | |
| 8,704,895 B2 | 4/2014 | Safaee-Rad et al. | |
| 8,836,796 B2 | 9/2014 | Dickins et al. | |
| 8,994,714 B2 | 3/2015 | Erinjippurath et al. | |
| 9,384,709 B2 | 7/2016 | Winer | |
| 9,462,265 B2 | 10/2016 | An et al. | |
| 9,479,769 B2 | 10/2016 | Wright et al. | |
| 9,532,023 B2 | 12/2016 | Hung | |
| 9,658,816 B2 | 5/2017 | Qian et al. | |
| 9,826,226 B2 | 11/2017 | Kunkel et al. | |
| 9,894,340 B2 | 2/2018 | Holub | |
| 10,192,514 B2 | 1/2019 | Su et al. | |
| 2004/0196250 A1 | 10/2004 | Mehrotra et al. | |
| 2010/0066837 A1* | 3/2010 | Kwong | H04N 9/73 348/180 |
| 2010/0188418 A1* | 7/2010 | Sakai | G01J 3/50 345/594 |
| 2011/0032286 A1* | 2/2011 | Takata | G09G 3/3648 345/690 |
| 2012/0127324 A1* | 5/2012 | Dickins | H04N 17/04 348/191 |
| 2014/0232709 A1* | 8/2014 | Dunn | G09G 5/02 345/207 |
| 2015/0229919 A1 | 8/2015 | Weber et al. | |
| 2015/0235615 A1* | 8/2015 | Yoshida | G09G 5/028 345/600 |
| 2015/0317928 A1* | 11/2015 | Safaee-Rad | G09G 3/20 345/593 |
| 2016/0050359 A1* | 2/2016 | Nakata | G03B 13/36 250/201.2 |
| 2016/0180780 A1* | 6/2016 | Chen | G09G 3/3413 345/207 |
| 2016/0323327 A1* | 11/2016 | Riecken | H04L 65/403 |
| 2017/0084250 A1* | 3/2017 | Jia | G01J 3/10 |
| 2017/0302915 A1 | 10/2017 | Kang et al. | |
| 2017/0345352 A1* | 11/2017 | Hemminki | G09G 3/006 |
| 2018/0204524 A1* | 7/2018 | Kucera | G09G 3/30 |

OTHER PUBLICATIONS

Monitor Adjustment—ColorNavigator, Retrieved from the Internet: <https://www.eizo.com/library/management/matching/calibration/step2_cn.html/>.

NEC SpectraViewII, Retrieved from the Internet: <https://www.necdisplay.com/support-and-services/spectra-view-ii/overviewNEC>.

CalMAN RGB Computer Calibration Software, Retrieved from the Internet: <https://calman.spectracal.com/>.

THX Ltd., THX tune-up™, App Store, Jan. 4, 2017, Retrieved from the Internet: <https://apps.apple.com/us/app/thx-tune-up/id592624594>.

Monitor Adjustment—ColorNavigator, EIZO Inc., Sep. 13, 2016, Retrieved from the Internet: <https://www.eizo.com/library/management/matching/calibration/step2_cn.html/>.

SpectraViewII, NEC Display Solutions, Apr. 30, 2014, Retrieved from the Internet: <https://www.necdisplay.com/support-and-services/spectra-view-ii/overviewNEC>.

CalMAN RGB Computer Calibration Software, SpectraCal, Jul. 6, 2016, Retrieved from the Internet: <https://calman.spectracal.com/>, Portrait Displays.

\* cited by examiner

DISPLAY CALIBRATION SYSTEM

This application claims the benefit of provisional patent application No. 62/696,233, filed Jul. 10, 2018, which is hereby incorporated by reference herein in its entirety.

BACKGROUND

This relates generally to displays, and, more particularly, to calibrating color displays.

Electronic devices often include displays. Color displays include pixels of different colors. For example, a display may include an array of pixels based on red, green, and blue light-emitting diodes. Due to manufacturing variations, light-emitting diodes may exhibit variations in output light intensity and wavelength. Unless care is taken, these variations may cause a display to exhibit undesired color shifts and other visible artifacts. Performance variations may also occur with the same display as the display ages through its useful lifetime.

Moreover, in some applications, users may want to adjust the display to conform to certain industry standards such as printing standards or cinema standards or may want to adjust the display to match the display characteristics of other displays.

Display calibration systems have been developed to help ensure that displays perform satisfactorily. However, display calibration systems generally require numerous separate devices that increase the complexity of performing display calibration operations and require a tedious calibration process that only properly calibrate few display parameters.

It would therefore be desirable to be able to provide improved display calibration systems.

SUMMARY

A first electronic device such as a mobile device with cellular communications functionalities may have a display and a color light sensor, such as a color ambient light sensor, mounted in a device housing. The color ambient light sensor may collect ambient light data used to configured the settings of the internal display. Additionally, the electronic device may be configured to calibrate an external display in a second electronic device.

Control circuitry in the first electronic device may generate test images, test data or test signals for the display in the second electronic device. The display of the second electronic device may emit image light corresponding to the test images, test data, or test signals. The ambient light sensor may generate displayed image measurement data by receiving the emitted image light from the display of the second electronic device. Control circuitry in the first electronic device may generate calibration data for the display of the second electronic device based on the displayed image measurement data and a target color space (e.g., defined by a user).

The second electronic device may receive and store the calibration data and use to the calibration data to generate images during normal display operations such that the generated images have colors in the target color space. In some scenarios, a third electronic device, such as a set-top box or computer may store the calibration data and provide calibrated image data to the second electronic device to directly display the calibrated image data.

DETAILED DESCRIPTION

Figure 1:
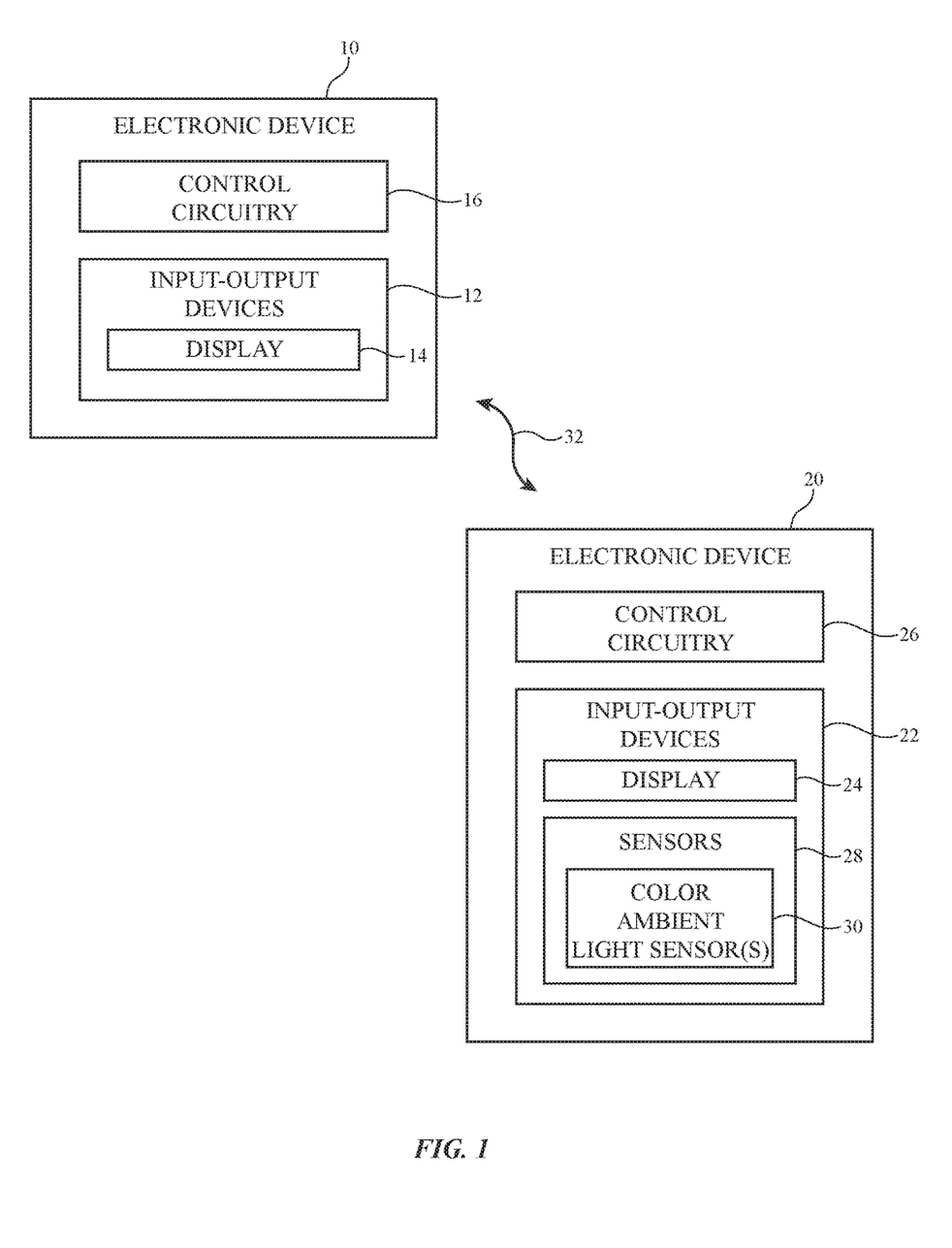
FIG. 1 is a diagram of a system having two electronic devices communicating with each other using a communications link in accordance with an embodiment.

FIG. 1 is a diagram showing a system of two electronic devices (e.g., electronic devices 10 and 20). As an example, device 20 may use a communications link (e.g., communications link 32) to perform display calibration operations for electronic device 10. Communications link 32 may be unidirectional or bidirectional communications based on a wireless local area network (WLAN) link such as a Wi-Fi® link or a wireless personal area network (WPAN) link such as a Bluetooth® link. If desired, communications link may be based on any other type of wireless link or a wired link (e.g., using cables that physically couple device 10 to device 20). as an example, communications link 32 may be used to convey control signals, data signals, calibration data or any suitable data or signals between devices 10 and 20.

Device 10 may be a laptop computer, a stand-alone display, an embedded system such as a kiosk or vehicle with a display, a television, a computer with an integrated display, a tablet computer, a cellular telephone, a wrist-watch device, other miniature handheld or wearable equipment, or other electronic equipment that includes a display.

As shown in FIG. 1, electronic device 10 may have control circuitry 16. Control circuitry 16 may include storage and processing circuitry for supporting the operation of device 10 (e.g., display driver circuitry, graphics processing circuitry, etc.). The storage and processing circuitry may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 16 may be used to control the operation of device 10 and the operation of a display in device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices (e.g., device 20). If desired, input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Display 14 includes an array of pixels 18. There may be any suitable numbers of rows and columns of pixels 18 in display 14 (e.g., tens, hundreds, thousands, tens of thousands, or more). Pixels 18 may be based on organic light-emitting diodes, crystalline semiconductor diodes (e.g., micro-light-emitting diodes), liquid crystal display structures, electrophoretic display structures, plasma display structures, electrowetting display structures, or other display technologies. Pixels 18 may include pixels of different colors. For example, pixels 18 may include red, green, and blue pixels or other sets of colors. Display 14 may have pixels of three different colors, pixels of four different colors, etc.

Due to manufacturing variations and/or for other reasons, pixels 18 in the array of pixels in display 14 will not all perform identically when assembled into display 14. Variations in the performance of pixels 18 may cause different portions of display 14 to produce outputs levels of varying intensity and color (i.e., display 14 may exhibit spatially varying color shifts and intensity fluctuations across different pixels). Device 20 may be used to generate calibration data for display 14 to minimize or eliminate these intensity and color fluctuations.

Electronic device 20 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which electronic device 20 is a cellular telephone in the display calibration system are sometimes shown and described herein as examples.

As shown in FIG. 1, electronic device 20 may have control circuitry 26. Control circuitry 26 may include storage and processing circuitry for supporting the operation of device 20. The storage and processing circuitry may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 26 may be used to control the operation of device 20. The processing circuitry may be based on one or more microprocessors, microcontrollers, digital signal processors, baseband processors, power management units, audio chips, application specific integrated circuits, etc.

Input-output circuitry in device 20 such as input-output devices 22 may be used to allow data to be supplied to device 20 and to allow data to be provided from device 20 to external devices (e.g., device 10). Input-output devices 22 may include buttons, joysticks, scrolling wheels, touch pads, key pads, keyboards, microphones, speakers, tone generators, vibrators, cameras, light-emitting diodes and other status indicators, data ports, etc. A user can control the operation of device 20 by supplying commands through input-output devices 22 and may receive status information and other output from device 20 using the output resources of input-output devices 22. As an example, input-output devices may include radio-frequency transceiver circuitry, cellular band communications systems, and other long range communications systems.

Input-output devices 22 may include one or more displays such as display 24. Display 24 may be a touch screen display that includes a touch sensor for gathering touch input from a user or display 24 may be insensitive to touch. A touch sensor for display 24 may be based on an array of capacitive touch sensor electrodes, acoustic touch sensor structures, resistive touch components, force-based touch sensor structures, a light-based touch sensor, or other suitable touch sensor arrangements.

Input-output devices 22 may also include sensors 28. Sensors 28 may include a (color) light sensor (sometimes referred to herein as a color light detector) such as color ambient light sensor 30, and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors). Illustrative configurations in which the color light sensor is a color ambient light sensor (e.g., color ambient light sensor 30) are sometimes described herein as an example. If desired, any suitable type of color light sensor (e.g., a sensor that detects properties such as intensity and color of received colored light) may be used in device 20 to perform display calibration operations.

Color ambient light sensor 30 for device 20 may have an array of detectors each of which is provided with a color filter. If desired, the detectors in ambient light sensor 30 may be provided with color filters of different respective colors. Information from the detectors may be used to measure the total amount of ambient light that is present in the vicinity of device 20. For example, the ambient light sensor may be used to determine whether device 20 is in a dark or bright environment. Based on this information, control circuitry 26 can adjust display brightness for display 24 or can take other suitable action.

Ambient light sensors 30 may be used to make ambient light intensity (brightness) measurements. Ambient light intensity measurements, which may sometimes be referred to as ambient light luminance measurements, may be used by device 20 to adjust display brightness (as an example). Ambient light sensors 30 may be used to make measurements of ambient light color (e.g., color coordinates, correlated color temperature, or other color parameters representing ambient light color). Processing circuitry 26 may be used to convert these different types of color information to other formats, if desired (e.g., a set of red, green, and blue sensor output values may be converted into color chromaticity coordinates and/or may be processed to produce an associated correlated color temperature, etc.).

Color information and brightness information from color sensing ambient light sensor 30 can be used to adjust the operation of device 20. For example, the color cast of display 24 may be adjusted in accordance with the color of ambient lighting conditions. If, for example, a user moves device 20 from a cool lighting environment to a warm lighting environment (e.g., an incandescent light environment), the warmth of display 24 may be increased accordingly, so that the user of device 20 does not perceive display 24 as being overly cold. If desired, the ambient light sensor may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 20, adjusting wireless circuitry settings, etc.).

Figure 2:
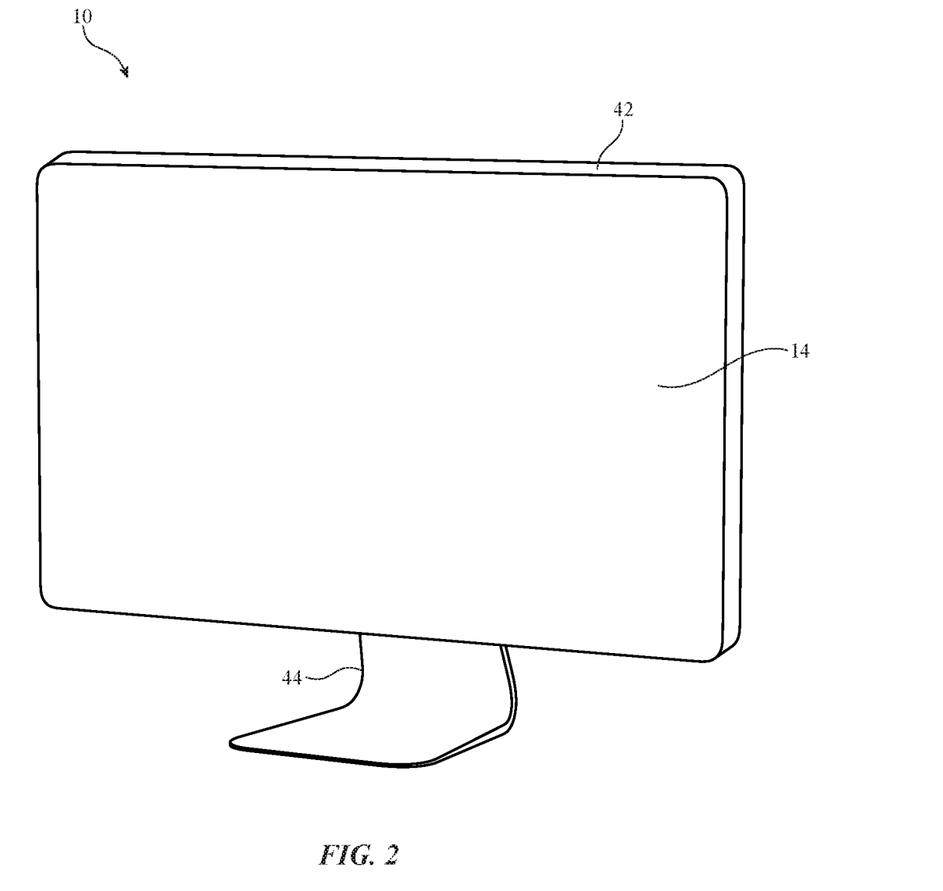
FIG. 2 is a perspective view of an illustrative electronic device having a display in accordance with an embodiment.

Furthermore, the ambient light sensor 30 of device 20 may be used to characterize and/or calibrate display 14 of device 10. In particular, FIG. 2 shows how electronic device 10 may be a display such as a computer monitor, a computer that has been integrated into a computer display, or other device with a built-in display. With this type of arrangement, housing 42 for device 10 may be mounted on a support structure such as stand 44 or stand 44 may be omitted (e.g., to mount device 10 on a wall). Display 14 may be mounted on a front face of housing 42.

In general, to calibration display 14 of device 10, specialized calibration equipment may be required. However, the specialized calibration equipment may be costly and complex to use as it may include multiple separate devices that require various cables and wires. To more efficiently calibration a display (e.g., display 14 of device 10), a calibration system that includes device 20 having ambient light sensor 30 may be used. Because device 20 may be a portable electronic device with multiple other functions (e.g., functions other than display calibration, cellular communications functionalities, internet-enabled functionalizes, mobile application functionalities, etc.), a user may frequently carry device 20. By configuring an easily accessible device to perform display calibration, specialized calibration equipment may be omitted.

Figure 3:
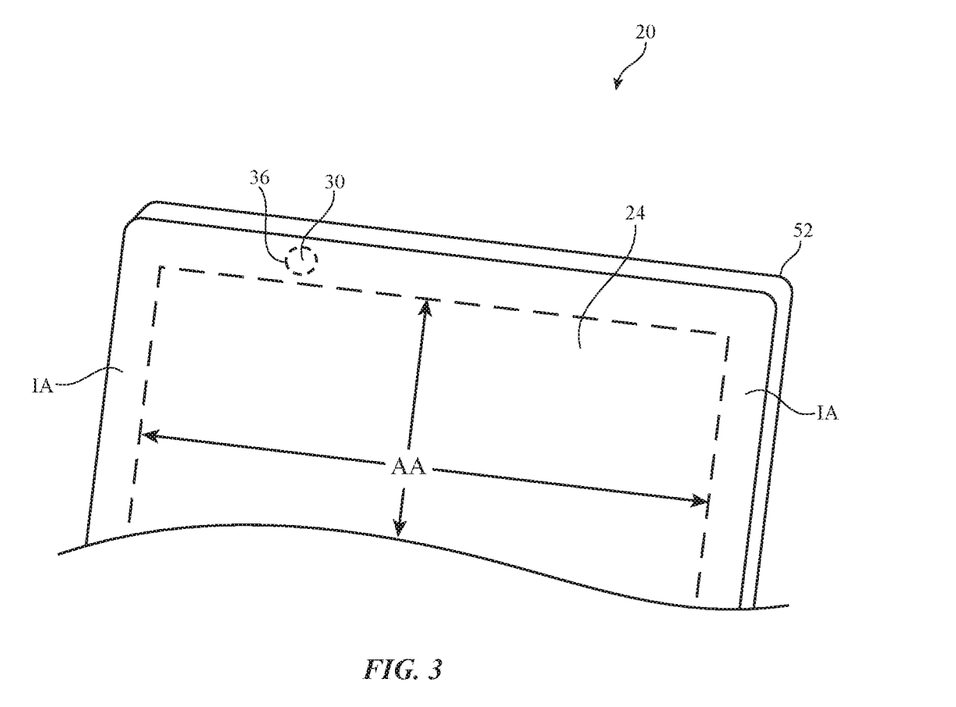
FIG. 3 is a perspective view of a portion of an illustrative device having a color light sensor in accordance with an embodiment.

A perspective view of a portion of an illustrative electronic device is shown in FIG. 3. In the example of FIG. 3, device 20 may include a display such as display 24 mounted in housing 52. Housing 52, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 52 may be formed using a unibody configuration in which some or all of housing 52 is machined or molded as a single structure or may be formed using multiple structures (e.g., an internal frame structure, one or more structures that form exterior housing surfaces, etc.).

Display 24 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 52 to form communications ports (e.g., an audio jack port, a digital data port, etc.), to form openings for buttons, etc.

Display 24 may be formed in a similar manner as display 14 in device 10. As an example, display 24 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 24 forms an active area AA. Active area AA is used to display images for a user of device 20. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 20, the underside of the outermost layer of display 24 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 24 such as region 36 in inactive border area IA. Ambient light from the exterior of device 10 may be measured by ambient light sensor 30 in device 20 after passing through region 36 and the display cover layer.

Figure 4:
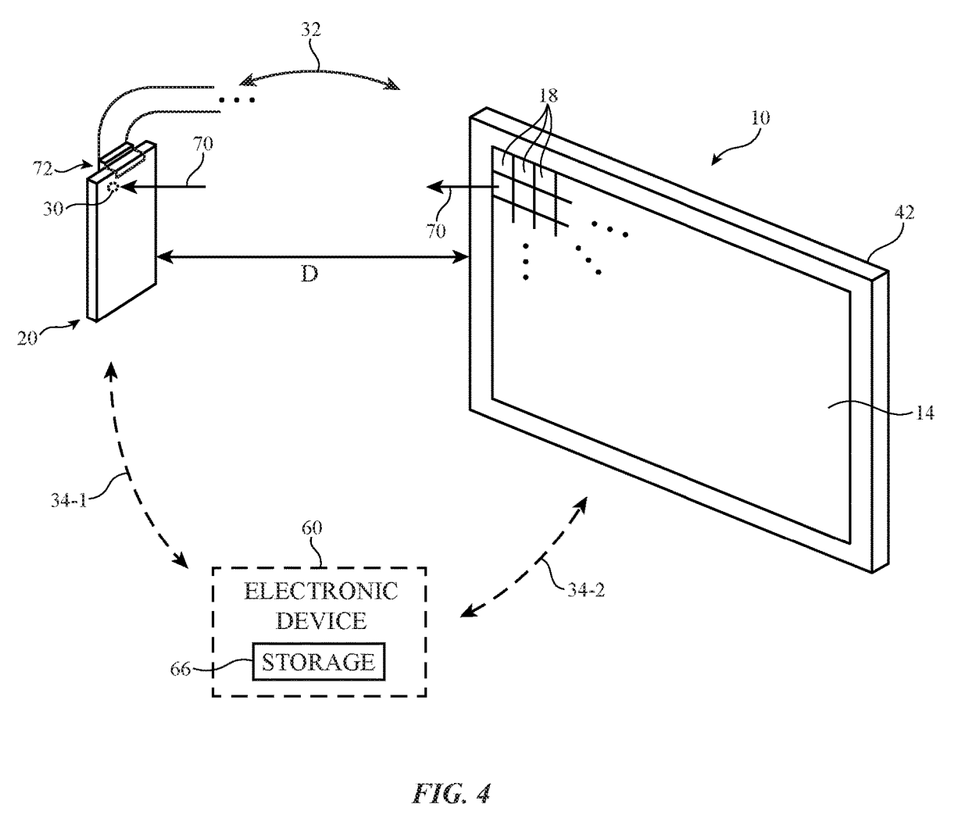
FIG. 4 is a diagram of an illustrative display calibration system in accordance with an embodiment.

During display calibration operations, the display calibration system as shown in FIG. 4 may include electronic device 20 that is configured to calibrate a display on electronic device 10. In particular, besides generating measurement data for adjusting display 24 in device 20, ambient light sensor 30 in device 20 may also be configured as (e.g., serve as) a colorimeter (i.e., color sensor) for receiving light emitted by pixels 18 in display 14, thereby enabling device 20 to perform display calibrations for display 14 in device 10. Device 20 (e.g., control circuitry 26 in device 20) may be configured as a test signal generator for display 14 in device 10. In other words, device 20 may generate test patterns or targets (e.g., test data, display test data, test images or target images such as partial target images using only a subset of pixels 18 in display 14 or complete target images using all pixels 18 in display 14) and associated signals for producing the test patterns on display 14. In general, the test patterns or targets may have any suitable shape corresponding to one or more pixels 18 and may convey any suitable color of any suitable intensity. Control circuitry 26 in device 20 may generate these signals (i.e., test signals) for calibrating display 14 and may convey the test signals to device 10 to display the test patterns on display 14. If desired, the test signals may be RGB (red, green, blue) values to be displayed directly on display 14.

In particular, input-output devices 22 such as wireless (or wired) communications systems (e.g., baseband circuitry, transceiver circuitry, antenna circuitry, etc.) in device 20 may convey the test signals and/or control signals associated with generating the test patterns or targets via communications link 32 to device 10. Control circuitry 16 in device 10 may control display 14 to display the test patterns that correspond to the test signals.

As an example, the test signals conveyed over communications link 32 may be signals corresponding to a sequence of red test images, green test images, blue test images, and gray test images that are displayed by one or more pixels 18 in display 14. However, this is merely illustrative. If desired, device 20 may convey any sequence of test images or test patterns to device 10 over communications link 32. As an example, the test signals may correspond to a single red test image, a single green test images, a single blue test image, and a series of gray-scale test image (e.g., from a white test image to a black test images by stepping through varying shades of gray images). Device 20 may convey the test signals (and control signals) to one or more pixels 18 in display 14 such that the one or more pixels 18 are configured to display the test patterns corresponding to the test signals (e.g., colored patterns that are red, green, blue, white, black, gray, and or any other colors). The test signals may be provided to display 14 on a row-by-row basis, a column-by-column basis, section-by-section basis, etc. Any suitable number of any suitable types of test patterns may be used to completely or partially calibrate display 14. As an example, the number of test patterns to calibrate display 14 may determine the resolution of the calibration (e.g., for a quicker display calibration process, a smaller number of test patterns may be used).

The resolution of the calibration system in FIG. 4 may also be determined by the size of the pixel test pattern. The calibration system may operate with a lower resolution when device 20 generates test patterns that involve the use of a larger group of pixels 18 to display each given test image. This may result in enhanced calibration throughput as fewer test pattern may be used to fully calibration display 14. The calibration system may operate with a higher resolution when device 20 generates test patterns that involve the use of a smaller group of pixels 18 to display each given test image. This may result in higher calibration accuracy as the corresponding calibration data is more specific to each smaller group of pixels 18.

Ambient light sensor 30 in device 20 may receive light 70 emitted by display 14 in device 10 that are associated with the displayed test patterns. To receive image light from pixels 18, ambient light sensor 30 may include one or more photodetectors (e.g., photodiodes) and associated amplifier and digitalizing circuitry implemented on a light detector integrated circuit. As an example, the light detector integrated circuit may include multiple photodetectors. The photodetectors may be formed from, as examples, charge-coupled device (CCD) technologies, complementary metal-oxide-semiconductor (CMOS) technologies, or using any other methods. Each photodetector may be overlapped by a respective color filter. Each color filter may be formed from colored ink or other material that selective passes a desired range of wavelengths to an associated overlapped photodetector (e.g., an organic color filter material such as polymer containing dyes and/or pigments).

If desired, a red-pass color filter material may overlap a first photodetector to form a red-light-sensing channel in ambient light sensor 30, a blue-pass color filter material may overlap a second photodetector to form a blue-light-sensing channel in ambient light sensor 30, a green-pass color filter material may overlap a third photodetector to form a green-light-sensing channel in ambient light sensor 30, etc. Ambient light sensor 30 may include any suitable number of color sensing channels. As an example, ambient light sensor 40 may include three, four, six, or nine color channels. The resolution of ambient light sensor 30 (e.g., photodetectors in sensor 30) may be sufficiently large to capture data from the array of pixels 18 in display 14.

A light diffuser may be incorporated into ambient light sensor 30 to ensure that the response of ambient light sensor 30 is even over a range of orientations relative to incoming light from pixels 18. Additionally, ambient light sensor 30 may include filters that block undesirable portions of light (e.g., infrared light) from reaching photodetectors in ambient light sensor 30. As an example, ambient light sensor may include a stack of dielectric layers that form a thin-film interference filter (e.g., layers of alternating higher and lower refractive index thin-film inorganic layers). If desired, ambient light sensor 30 may also include a light guide that help route incoming ambient light to the light detector integrated circuit in ambient light sensor 30.

Ambient light sensor 30 may measure light 70 emitted from display 14 (e.g., the intensity or luminance, and color associated with light 70) after light 70 has passed through various filter layers and diffuser layers in ambient light sensor 30. The measured light sensor data from ambient light sensor 30 (i.e., the intensity and color data on the light emitted by the pixels 18) may be provided to control circuitry 26 in device 20.

Control circuitry 26 in device 20 may process the received images (e.g., compare the received images to a standard image) to generate calibration data for display 14. In other words, control circuitry 26 may generate the calibration data by comparing the received light signals (associated with the displayed test image) with the test image associated with the test signals. Control circuitry 26 may thereby determine any differences (in color and in intensity) between the displayed image and the intended test image to characterize the performance of one or more corresponding pixels 18 in display 14. In other words, display 14 (e.g., pixels 18 in display 14) may inherently display colors in a color space, which is compared to a reference color space. The reference color space may be referred to herein as a target color space. The calibration data may adjust or transforms points in the display color space to points in the target color space.

As an example, the test pattern may be emitted in a pixel-by-pixel manner. This allows the display calibration system to evaluate the performance of pixels 18 in display 14 as a function of position of the tested one or more pixels. The calibration data may include pixel-by-pixel calibration adjustment to the output of each pixel so that color and intensity can be corrected across all pixels 18 in display 14 (i.e., the calibration data may include pixel-specific color calibration data). If desired, control circuitry 26 may generate global display calibration data (i.e., color and intensity adjustments that apply to some or all of pixels 18 equally).

In particular, the calibration data may be a 3-D look-up table (3-D LUT), a transform function (e.g., based on a first inverse gamma conversion, a second 3×3 matrix conversion, and an RGB tonal response conversion), or any other color calibration profile.

The measurement and calibration process may be performed at a single luminance level for the pixels, or at multiple luminance levels for the pixels. Measurement and calibration at different luminance levels can provide improved color fidelity when the gamma response curves of the subpixel color channels are subject to variability. The measurement and calibration process may also be performed for different target color spaces. For example, under some circumstances it may be desirable for the display to render in the sRGB color space, but for other circumstances it may be desirable for the display to render in color spaces such as Adobe RGB, DCI-P3, or Rec 2020. For example, the display may draw on these different calibration settings when switched between one color space mode and another by a display color management system.

After control circuitry 26 in device 20 generates the calibration data for display 14. The calibration data may be conveyed to device 10 via communications link 32 or any other suitable means. As described above in connection with FIG. 1, device 10 may include storage circuitry (e.g., control circuitry may include storage circuitry). After processing the measurement data from ambient light sensor 30 to generate display calibration data for display 14, control circuitry 26 of device may load the display calibration data into the storage circuitry in device 10 having display 14. In other words, after receiving the calibration data from device 20, control circuitry 16 in device 10 may store the display calibration data into the storage circuitry in device 10. Thereafter, when display 14 in device 10 is operated (e.g., used to display images during normal display operations), display 14 can apply the calibration data that has been loaded into the storage circuitry in device 10 (e.g., such that color offsets, intensity offsets, and other corrections may be applied), thereby ensuring that display 14 displays more accurate images.

If desired, during display calibration operations, device 20 may be placed a fixed distance D from device 10 such that ambient light sensor 30 in device 20 is facing display 14 in device 10. As an example, device 20 may be placed in a device holder apparatus (e.g., apparatus 72) at a fixed distance D from device 10. If desired, the device holder apparatus may be attached to device 10 such that it physically couples device 20 to device 10. If desired, a user may hold device 10 during display calibration operations. In some scenarios, an accessory (e.g., apparatus 72) may hold device 20 in place such that device 20 (or ambient light sensor 30) is aligned with the center of display 14 with ambient light sensor 30 facing display 14. Additionally, the accessory may include a counterweight to hold device 20 in place.

In some scenarios, it may not be possible or desirable to store display calibration data on storage circuitry in device 10 (e.g., device 10 may not have storage circuitry or may have insufficient storage capacity, device 10 may be unable to effectively communicate with device 20, etc.). In these cases, the display calibration system may include a third electronic device (e.g., electronic device 60).

Electronic device 60 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 60 may also be a set-top box, a desktop computer, or other suitable electronic equipment. Illustrative configurations in which electronic device 60 is be a set-top box or computer that is coupled to a computer monitor, television, or other display are sometimes described herein as an example.

Electronic device 60 may include similar components as device 10 and/or device 20. As an example, electronic device 60 may include processing circuitry, storage circuitry, input-output devices, and any other suitable components. Device 60 may be coupled to device 10 via communications link 34-2. Communications link 34-2 may be a wired link (e.g., using cables such as High-Definition Multimedia Interface (HDMI) cables, Digital Visual Interface (DVI) cables, etc.), or a wireless link based on a wireless local area network (WLAN) link such as a Wi-Fi® link, a wireless personal area network (WPAN) link such as a Bluetooth® link, or any other suitable wireless communications technologies. Device 60 may supply image or video content to device 10 for display via communications link 34-2. In other words, if desired, device 60 may directly provide RGB (i.e., red, green, blue) data to device 10 for display.

Device 10 may communicate with electronic device 60 via communications link 34-1. Link 34-1 may be based on a similar communications link as link 32 and/or 34-1. In the scenario where the display calibration system includes electronic device 60, electronic device 60 may serve as an intermediary between devices 10 and 20. Instead of providing calibration data directly from device 20 to device 10, device 20 may provide the calibration data to device 60. Device 60 may store the calibration data for display 14 in device 10 at storage circuitry 66. Before device 60 provides the RGB data, image data, or video data to be displayed to device 10, device 60 may first modify the data to incorporate the calibration data. By using device 60 to generate display-calibrated RGB, image, or video data to the corresponding display, any arbitrary display may be calibrated.

Figure 5:
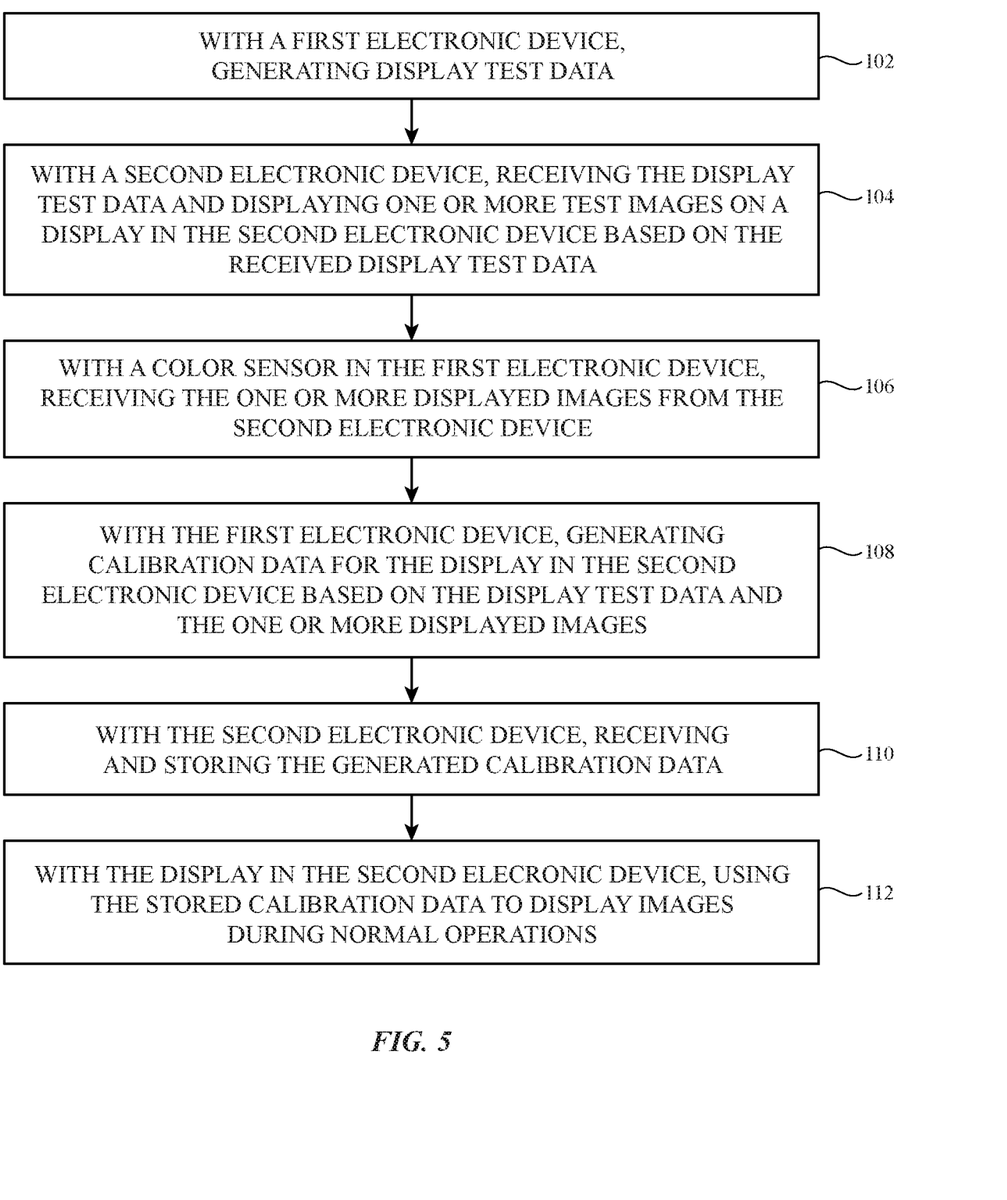
FIG. 5 is a flow chart of illustrative steps for performing display calibration operations in accordance with an embodiment.

FIG. 5 shows a flow chart with illustrative steps for performing display calibration (e.g., using the display calibration system shown in FIG. 4). At step 102, a first electronic device (e.g., device 20 in FIG. 4) may be used to generate display test data (e.g., test targets or test patterns). As an example, device 20 may run or process a display calibration application using control circuitry 26. The calibration application may prompt a user to select or provide input for a reference color space to which a display should be calibrated and other calibration settings (e.g., a number of test patterns, a size of test patterns, a preferred sequence of test colors, etc.). Based on the calibration settings, control circuitry 26 in device 20 may generate the test data and convey the test data to a second electronic device (e.g., device 10 in FIG. 4).

At step 104, the second electronic device (e.g., device 10) may receive the generated test data. Control circuitry 16 in device 10 may control a display (e.g., display 14) to display one or more test images or test patterns on display 14 in device 10 based on the received display test data. In other words, one or more pixel 18 in display 14 may emit light (e.g., light 70 in FIG. 4) corresponding to the color and intensity of the test patterns.

At step 106, a color sensor in the first electronic device (e.g., ambient light sensor 30 in device 20) may receive test image data or test pattern data based on received light 70. The received light 70 may be associated with one or more of the displayed test images from the second electronic device (e.g., display 14 in device 10). In other words, ambient light sensor 30 may measure the amount of primary colors, the tone response curve, color patches associated with receive light 70.

At step 108, the first electronic device (e.g., control circuitry 26 in device 20) may generate calibration data for the display in the second electronic device (e.g., display 14 in device 10) based on the display test data and the displayed image data measured from light 70. In particular, based on the image data associated with one or more of the displayed test images, control circuitry 26 may generate a color space associated with display 14 (without calibration). Control circuitry 26 may compare the uncalibrated color space associated with display 14 to a target reference color space (e.g., a user-defined color space in step 102). Control circuitry 16 may generate a transfer function or transform used to calibrate display 14 to display images in the target reference color space. The transfer function or transform may form the calibration data (e.g., a 3-D LUT, a transform function, etc.) that calibrates display 14 in device 10. As an example, these calibration operations may take place within the calibration application processed by control circuitry 16 as described in step 102.

At step 110, the second electronic device (e.g., device 10) may receive and store the generated calibration data.

At step 112, the display in the second electronic device (e.g., display 14 in device 10) use the stored calibration data to display images during normal image or video display operations.

While processing of steps 102-112 in FIG. 5 is described to take place using the corresponding circuitry in the corresponding electronic devices, this is merely illustrative. If desired any other suitable circuitry may be used to process the steps of 102-112 in FIG. 5

As an example, a third electronic device (e.g., device 60 in FIG. 4) may act an intermediary between steps 102 and 104. In other words, device 60 may first receive the generated test data and pass the generated test data to device 10. As another example, step 110 may be performed by device 60. In other words, device 60 may receive and store the generated calibration data instead of device 10. Accordingly, at step 112, device 60 may receive image or video data to be displayed on display 14 in device 10. Device 60 may modify the image or video data using the stored calibration data and provide the modified image or video to display 14 in device 10 during normal operations. If desired, the test data generation and calibration data generation functionalities may be performed on a different device than device 20 (e.g., device 60, device 10, etc.).

In some scenarios, it may be desirable to use electronic device 60 to run or process a display calibration application instead of electronic device 20. As an example, this may occur where the operation of electronic device 60 and electronic device 10 are closely tied to each other (e.g., electronic device 10 is a computer monitor or display for electronic device 60, which is a desktop computer or laptop computer, electronic device 10 and electronic device 60 operate based on the same operating system, electronic device 10 and electronic device 60 operate in the same device ecosystem, etc.).

Figure 6:
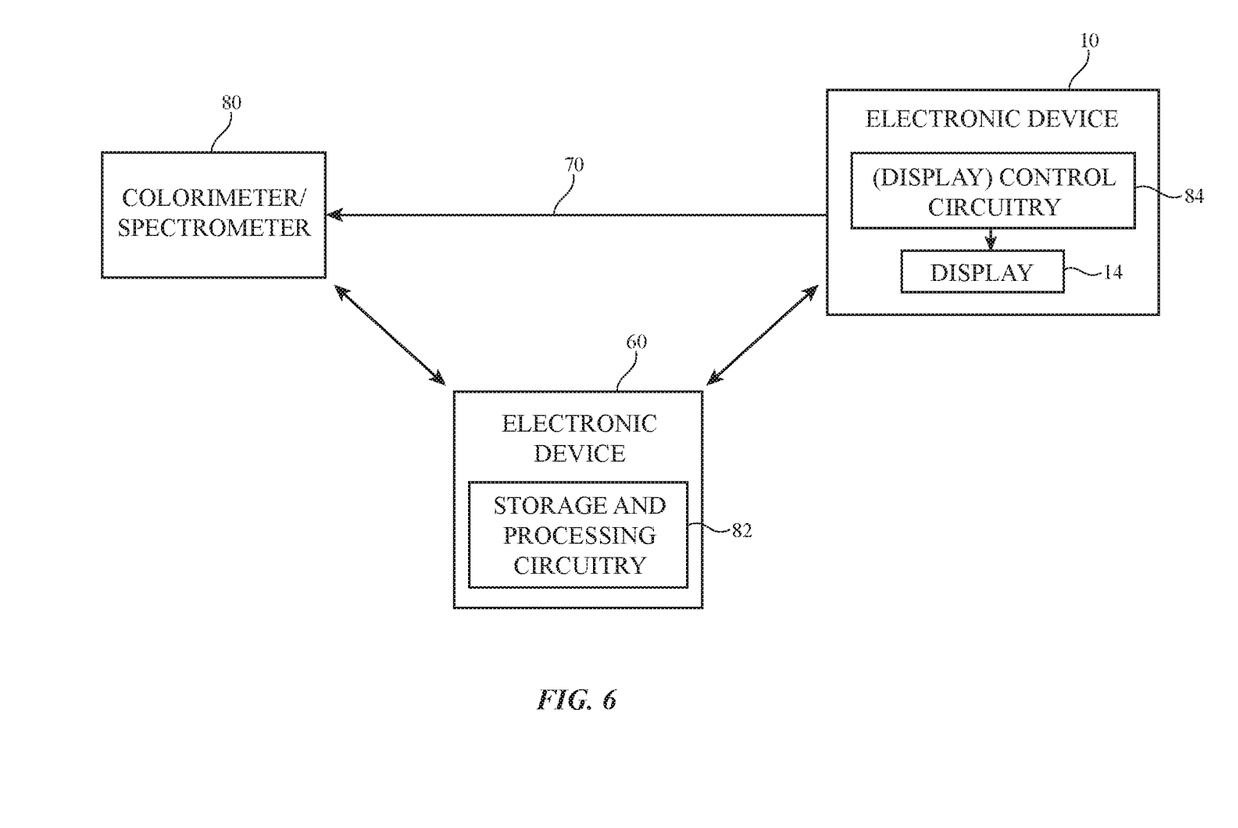
FIG. 6 is a diagram of an illustrative calibration system having a stand-alone display in accordance with an embodiment.

FIG. 6 shows an illustrative display calibration system comprising device 60, which is operable to perform processing for calibrating display 14 in device 10. Illustrative configurations in which device 10 is a computer display or monitor and device 60 is a desktop or laptop computer that supplies image or video content to device 10 for display are sometimes described herein as examples. However, as described in connection with FIGS. 1 and 4, devices 10 and 60 may be of any suitable device type.

In particular, device 10 may be a computer display that includes display (panel) 14 and display control circuitry 84. Display control circuitry 84 may include timing controller circuitry, backlight controller circuitry, memory controller circuitry, scaler circuitry, etc. that control the operation of display panel 14 or other portions of computer display 10.

Device 60 may be a computer that displays images on computer display 10. As an example, computer 60 may without an internal display. If desired, computer 60 may include an internal display and may also use computer display 10 to display images from computer 60. Computer 60 may include storage and processing circuitry 82 that is used to run software on computer 60 such as internet browsing application, email applications, media playback applications, operation system functions, etc. To support interactions with external equipment, storage and processing circuitry 28 may be used in implemental communications protocols such as internet protocols, wireless local area network protocols, protocols for other short-range wireless communications links, MIMO protocols, antenna diversity protocols, etc.

Additionally, in order to desirably use computer display 10, computer 60 may perform a set of calibration operations by storing and processing a display calibration application using storage and processing circuitry 82. The display calibration application may include instructions to provide test data to computer display 10 and to receive displayed test data from colorimeter or spectrometer 80 (that receives the displayed test data via path 70).

If desired, colorimeter 80 may be provided in device 20 as described in connection with FIG. 4. In this example, an ambient light sensor in device 20 may serve as colorimeter 80. Device 20 or device 60 may apply transfer functions to data obtained from the ambient light sensors to determine ambient lighting and/or display test patterns. If desired, the transfer functions may be generated based on training data applied to one or more machine learning algorithms. As an example, processing circuitry in device 20 or device 60 may generate the transfer function that converts ambient light sensor reading to display color and luminance measurements in order to use the ambient light sensor in device 20 to calibrate the display.

Alternatively, colorimeter 80 may be a dedicated color sensor or a device having color sensing functionalities but is without other functionalities.

The display calibration application may receive input (from a user) indicative of a target display setting (e.g., having parameters includes one or more a desirable display color space, a desirable white point, a desirable peak brightness, a desirable electro-optical transfer function or EOTF, etc.). As an example, the display calibration application may receive a selection to calibrate computer display 10 in a predefined (industry) standard display setting such as Digital Cinema, SDR HDTV, Print Soft Proof, Archival HD, etc. As another example, the display calibration application may receive a customized display setting that specifies one or more of display setting parameters. Based on the input of a target display setting, storage and processing circuitry 82 (when processing the display calibration application) may generate appropriate test data and categorically perform calibration operations based on each of the input parameters. Storage and processing circuitry 82 may consequently generate calibration data that when used, implements the target display setting at computer display 10.

Figure 7:
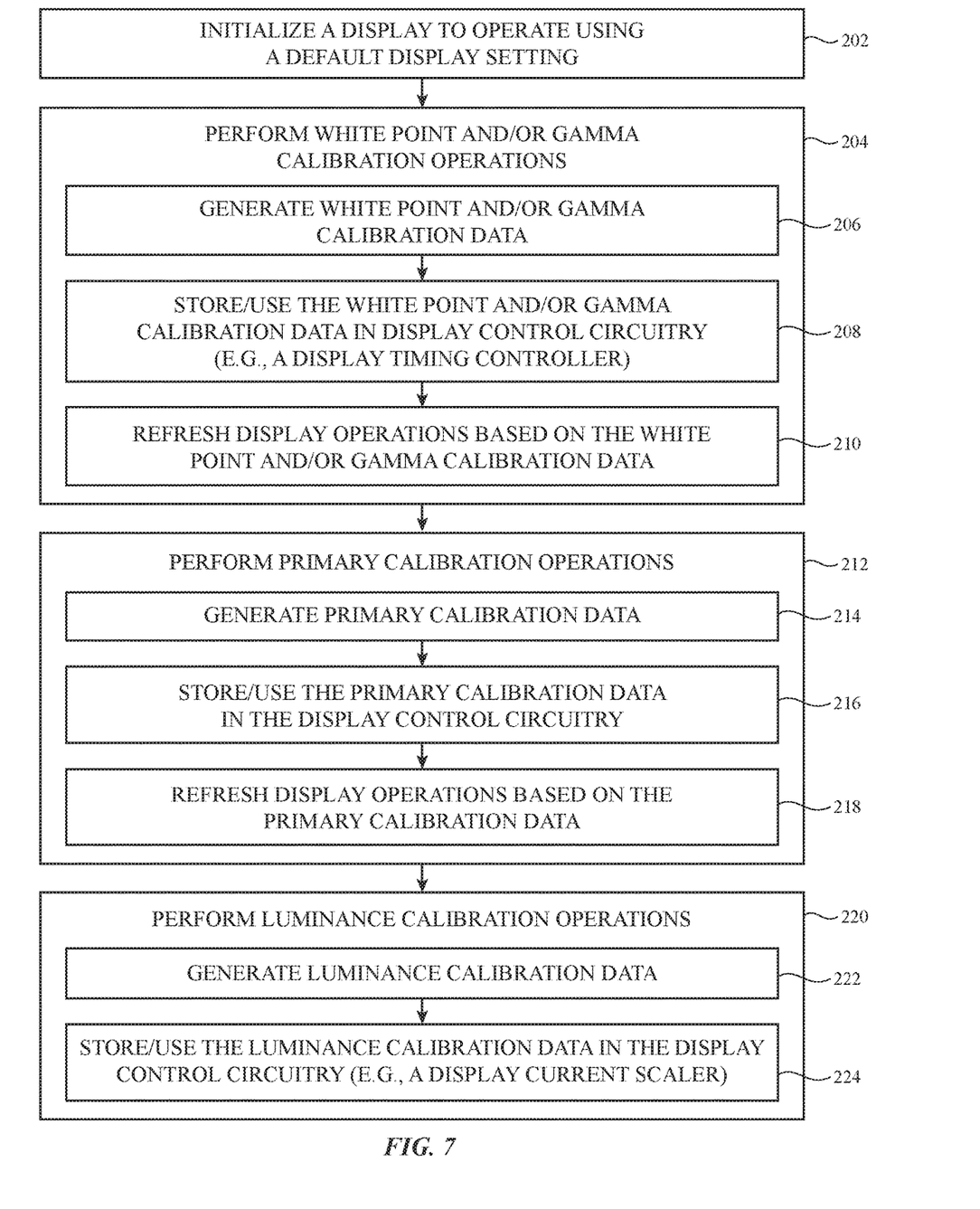
FIG. 7 is a diagram of illustrative steps for performing display calibration operations for multiple display parameters in accordance with an embodiment.

FIG. 7 shows illustrative steps performed by processing circuitry in one or more of devices 10, 20, and 60 and colorimeter 80 in connection with a display calibration application. Illustrative configurations in which processing circuitry 82 in device 60 performs the steps of FIG. 7 while processing a display calibration application stored on device 60 are sometimes described herein as examples. If desired, other processing circuitry in any suitable device in the calibration system may perform the steps of FIG. 7. As an example, these illustrative steps may be applied to any suitable display calibration system such as those shown in FIGS. 4 and 6, or any other system.

At step 202, processing circuitry such as processing circuitry 82 in FIG. 6 may initialize a display such as computer display 10 to operate using a default display setting. The default display setting may be predefined and may be the same across different displays of the same type. The default setting may be defined by a unity matrix or table.

At step 204, the processing circuitry may perform white point and/or gamma calibration operations. Although it may be desirable to complete both white point and gamma calibration for a complete display calibration process, in some scenarios such as where colorimeter 80 has sensing limitations, the processing circuitry may perform white point calibration operations without gamma calibration operations. Otherwise, the processing circuitry may perform white point and gamma calibration operations.

As part of performing the white point and/or gamma calibration operations, at step 206, the processing circuitry may generate the corresponding white point and/or gamma calibration data. The calibration data may be in the form of a look-up table (LUT) or any other data structure representative of a transfer function. At step 208, the processing circuitry may provide the corresponding white point and/or gamma calibration data to display control circuitry (e.g., to a display timing controller). In other words, the display control circuitry may store and use the corresponding white point and/or gamma display calibration data to implement at least a portion of the target display setting. At step 210, the processing circuitry may provide instructions to refresh display operations based on the newly stored white point and/or gamma calibration data (e.g., using the calibration data to when displaying images on display panel 14). If desired, computer display 10 may automatically use the stored calibration data without instructions from the processing circuitry.

After performing the white point and/or gamma calibration operations, the processing circuitry may process step 212 to perform primary (colors) calibration operations.

As part of performing the primary calibration operations, at step 214, the processing circuitry may generate primary colors (i.e., primaries, e.g., RGB colors) calibration data. The primary calibration data may be a primary calibration 3×3 matrix. If desired, the primary calibration data may be stored in the form of any other suitable data structure. At step 216, the processing circuitry may provide the primary calibration data to display control circuitry (e.g., a display timing controller). In other words, the display control circuitry may store and use the primary calibration data to implement at least a portion of the target display setting. At step 218, the processing circuitry may provide instructions to refresh display operations based on the newly stored primary calibration data in addition to white point and/or gamma calibration data (e.g., using the calibration data to when displaying images on display panel 14). If desired, computer display 10 may automatically use the stored calibration data without instructions from the processing circuitry.

After performing the primary calibration operations, the processing circuitry may process step 220 to perform luminance calibration operations. The luminance calibration operations may include maximum brightness or luminance calibrations, and if desired, may include dark level calibrations.

As part of performing the luminance calibration operations, at step 222, the processing circuitry may generate luminance calibration data. The luminance calibration data may be an estimated truncation value and/or may be a current scaler value, as examples. At step 224, the processing circuitry may provide the luminance calibration data to display control circuitry (e.g., scaler circuitry, a display current scaler, a display backlight current scaler). In other words, the display control circuitry may store and use the luminance calibration data to implement at least a portion of the target display setting.

In accordance with any of the above arrangements, non-transitory computer-readable storage media (in any of devices 10, 20, and/or 60) may include instructions for performing the operations described herein (e.g., the steps of operation described in connection with FIGS. 1-7).

By performing white point, gamma, primary, and luminance calibration operations using the processing circuitry as described in connection with at least FIGS. 6 and 7, a display calibration system may streamline the calibration process to accurately calibrate displays to any desirable target display setting. In particular, device 60 may handle a significant portion of the calibration operations using processing circuitry 82 while processing the display calibration operations to offload many of the tedious tasks previously provided using other devices.

The foregoing is merely illustrative and various modifications can be made to the described embodiments. The foregoing embodiments may be implemented individually or in any combination.

What is claimed is:

1. A display calibration system, comprising:
   a first electronic device having control circuitry configured to generate display test data; and
   a second electronic device having a display configured to generate image light based on the display test data, wherein the first electronic device is configured to receive the image light and generate display measurement data based on the received image light, wherein the control circuitry is configured to generate calibration data for the display based on the generated measurement data, and wherein the second electronic device is configured to be coupled to a third electronic device having storage circuitry for storing the calibration data for the display, the third electronic device being operable to modify image display data for the display using the calibration data.

2. The display calibration system defined in claim 1, wherein the first electronic device comprises an ambient light sensor and wherein the ambient light sensor is configured to receive the image light and generate the display measurement data based on the received image light.

3. The display calibration system defined in claim 2, wherein the first electronic device includes an additional display, wherein the ambient light sensor is configured to generate ambient light measurement data, and wherein the control circuitry is configured to adjust the operation of the additional display based on the ambient light measurement data.

4. The display calibration system defined in claim 2, wherein the first electronic device includes wireless communications circuitry operable to convey the display test data and the calibration data.

5. The display calibration system defined in claim 4, wherein the wireless communications circuitry comprises cellular band communications circuitry.

6. The display calibration system defined in claim 1, wherein the third electronic device is operable to provide the modified image display data to the display.

7. The display calibration system defined in claim 1, wherein the first electronic device comprises a color ambient light sensor.

8. The display calibration system defined in claim 7, wherein the first electronic device comprises a mobile device with cellular communications functionalities.

9. The display calibration system defined in claim 7, further comprising:
   an accessory that holds the first electronic device in place while facing the color ambient light sensor towards the display.

10. A display calibration device, comprising:
a housing;
a color light sensor in the housing; and
control circuitry in the housing, wherein the control circuitry is configured to generate display test signals associated with a sequence of test images generated based on a target color space for an external display, wherein the color light sensor is configured to receive emitted light associated with the test signals from the external display and to generate color and intensity measurement data for each image in the sequence of test images to characterize the external display, and wherein the control circuitry is configured to generate display calibration data for the external display based on the color and intensity measurement data and the target color space.

11. The display calibration device defined in claim 10, further comprising:
wireless communications circuitry configured to convey the test signals and the display calibration data to the external display.

12. The display calibration device defined in claim 10, further comprising:
an internal display mounted in the housing, wherein the color light sensor is configured to generate ambient light measurement data that is used to adjust the settings of the internal display.

13. The display calibration device defined in claim 10, wherein the display calibration device comprises a mobile device with cellular communications functionalities.

14. The display calibration device defined in claim 10, wherein the housing of the display calibration device is separate from a housing of the external display.

15. A method of calibrating a display using an electronic device, comprising:
with control circuitry in the electronic device, generating a sequence of test images for the display;
with a color light sensor in the electronic device, generating color and intensity measurement data for each image in the sequence of test images based on emitted light from the display to characterize the display, wherein the emitted light is associated with the sequence of test images; and
with the control circuitry, generating calibration data for the display based on the color and intensity measurement data and a target color space for the display, wherein the sequence of test images is generated based on the target color space.

16. The method defined in claim 15, further comprising:
receiving the target color space from a user.

17. The method defined in claim 15, wherein each image in the sequence of test images has a different color.

18. The method defined in claim 15, further comprising:
providing the display with the calibration data, wherein the display is operable to modify image data using the calibration data to display an image having colors in the target color space.

19. The method defined in claim 15, wherein the electronic device has a housing, wherein the control circuitry and the color light sensor are mounted in the housing, and wherein the display is external to the housing.

20. A display calibration system, comprising:
a first device configured to supply image content to a second device that includes display control circuitry operable to control a display of the second device to display the image content, wherein the first device includes processing circuitry operable to:
perform a white point calibration operation for the display;
perform a primary colors calibration operation for the display; and
perform a luminance calibration operation for the display after the primary colors calibration operation.

21. The display calibration system defined in claim 20, wherein the processing circuitry is operable to perform the primary colors calibration operation after the white point calibration operation.

22. The display calibration system defined in claim 20, wherein a colorimeter is configured to receive the displayed image content and to generate sensor data based on the received image content, wherein the processing circuitry is operable to receive the sensor data and to generate white point calibration data, primary colors calibration data, and luminance calibration data based on the sensor data.

23. The display calibration system defined in claim 22, wherein the colorimeter comprises an ambient light sensor in a third electronic device.

* * * * *

UNITED STATES PATENT AND TRADEMARK OFFICE
CERTIFICATE OF CORRECTION

PATENT NO. : 10,911,748 B1
APPLICATION NO. : 16/506410
DATED : February 2, 2021
INVENTOR(S) : Robert K. Molholm et al.

It is certified that error appears in the above-identified patent and that said Letters Patent is hereby corrected as shown below:

On the Title Page

Item (72), the first inventor's name "Robert Molholm," should read -- Robert K. Molholm --

Signed and Sealed this
Twenty-fourth Day of May, 2022

Katherine Kelly Vidal
Director of the United States Patent and Trademark Office